US012607445B2

(12) United States Patent
Able

(10) Patent No.: US 12,607,445 B2
(45) Date of Patent: Apr. 21, 2026

(54) PIPE ALIGNMENT DEVICE

(71) Applicant: Luke Able, McConnelsville, OH (US)

(72) Inventor: Luke Able, McConnelsville, OH (US)

( * ) Notice: Subject to any disclaimer, the term of this patent is extended or adjusted under 35 U.S.C. 154(b) by 335 days.

(21) Appl. No.: 18/229,752

(22) Filed: Aug. 3, 2023

(65) Prior Publication Data

US 2025/0044070 A1      Feb. 6, 2025

(51) Int. Cl.
*G01B 5/24* (2006.01)

(52) U.S. Cl.
CPC ...................................... *G01B 5/24* (2013.01)

(58) Field of Classification Search
CPC ...................................................... G01B 5/24
See application file for complete search history.

(56) References Cited

U.S. PATENT DOCUMENTS

| | | | | |
|---|---|---|---|---|
| 1,020,020 | A * | 3/1912 | Brawley | G01C 9/26 |
| | | | | 33/574 |
| 2,624,953 | A * | 1/1953 | Newcomb | G01C 9/28 |
| | | | | 33/372 |
| 2,717,454 | A * | 9/1955 | Sekki | B25H 7/005 |
| | | | | 33/529 |
| 2,858,612 | A * | 11/1958 | Verrett | B43L 13/206 |
| | | | | 33/476 |
| 3,545,091 | A | 12/1970 | Sebastiani | |
| 3,826,013 | A | 7/1974 | Baher | |
| 4,335,523 | A | 6/1982 | Bryant | |
| 4,338,725 | A * | 7/1982 | Martin | B25H 7/005 |
| | | | | 33/529 |

| | | | | |
|---|---|---|---|---|
| 4,375,724 | A * | 3/1983 | Brock | G01B 3/56 |
| | | | | 33/529 |
| 4,662,055 | A | 5/1987 | VanMeter | |
| 5,231,766 | A * | 8/1993 | Pavlak | G01B 3/56 |
| | | | | 33/529 |
| 6,427,993 | B1 * | 8/2002 | Prochac | B23K 37/0533 |
| | | | | 269/45 |
| 6,470,586 | B2 * | 10/2002 | Kneipp | G01B 5/24 |
| | | | | 33/529 |
| 6,505,412 | B2 * | 1/2003 | Hauzie, Jr. | G01B 3/563 |
| | | | | 33/645 |
| 6,560,887 | B2 * | 5/2003 | Byrnes | G01B 3/563 |
| | | | | 33/534 |
| 7,305,773 | B2 * | 12/2007 | Hios | G01C 9/18 |
| | | | | 33/482 |
| 8,713,811 | B2 * | 5/2014 | Carrell | B25H 7/005 |
| | | | | 33/529 |

(Continued)

FOREIGN PATENT DOCUMENTS

| | | |
|---|---|---|
| CA | 2639879 | 5/2009 |

*Primary Examiner* — Yaritza Guadalupe-McCall

(57) ABSTRACT

A pipe alignment device includes a first pipe that has an outer wall and a second pipe that has an outer wall. Each of the first pipe and the second pipe is insertable into a fitting for joining the first pipe to the second pipe. An alignment jig is included which has a pair of planar alignment edges and a cutout extending between the pair of planar alignment edges. The alignment jig is positioned on the first pipe and the second pipe such that the cutout accommodates the fitting. Each of the first pipe and the second pipe is adjusted to lie flush against the respective pair of planar alignment edges for precisely aligning each of the first pipe and the second pipe in the fitting prior to permanently installing the fitting.

5 Claims, 5 Drawing Sheets

(56)          References Cited

U.S. PATENT DOCUMENTS

| | | | |
|---|---|---|---|
| 9,021,713 B1 * | 5/2015 | Pierson | B43L 7/10 |
| | | | 33/529 |
| 9,931,885 B1 * | 4/2018 | Pierson | G01B 5/24 |
| 10,514,243 B2 * | 12/2019 | Gjertsen | G01B 5/24 |
| D898,595 S | 10/2020 | Wojciechowski | |
| 11,453,038 B2 | 9/2022 | Sullivan | |
| 2002/0066774 A1 * | 6/2002 | Prochac | B23K 37/0533 |
| | | | 228/44.3 |
| 2002/0088132 A1 * | 7/2002 | Byrnes | G01B 3/563 |
| | | | 33/529 |
| 2002/0092191 A1 * | 7/2002 | Hauzie, Jr. | G01B 5/25 |
| | | | 33/529 |
| 2007/0245581 A1 * | 10/2007 | Hios | B43L 7/10 |
| | | | 33/429 |
| 2013/0276316 A1 * | 10/2013 | Carrell | B25H 7/005 |
| | | | 33/290 |
| 2025/0044070 A1 * | 2/2025 | Able | G01B 5/24 |

* cited by examiner

PIPE ALIGNMENT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to alignment devices and more particularly pertains to a new alignment device for the device includes an alignment jig that has a pair of planar alignment edges and a cutout positioned between the planar alignment edges. Each of the planar alignment edges is positioned on a respective one of a pair of pipes being joined together in a fitting having the fitting being positioned in the cutout. The pair of pipes are adjusted to lie flush against the respective planar alignment edge to precisely align the pair of pipes prior to permanently installing the fitting.

(2) Description of Related Art Including Information Disclosed Under 37 CFR 1.97 and 1.98

The prior art relates to alignment devices including a variety of spirit levels that each has a pair of leveling surfaces being oriented at an angle with each other for measuring level between a pair of surfaces. In no instance does the prior art discloses a pipe leveling device that includes a pair of planar alignment surfaces and a cutout being positioned between the planar alignment surfaces such that each of the planar alignment surfaces can be positioned on a respective pipe having the cutout accommodating a fitting joining the pair of pipes together.

BRIEF SUMMARY OF THE INVENTION

An embodiment of the disclosure meets the needs presented above by generally comprising a first pipe that has an outer wall and a second pipe that has an outer wall. Each of the first pipe and the second pipe is insertable into a fitting for joining the first pipe to the second pipe. An alignment jig is included which has a pair of planar alignment edges and a cutout extending between the pair of planar alignment edges. The alignment jig is positioned on the first pipe and the second pipe such that the cutout accommodates the fitting. Each of the first pipe and the second pipe is adjusted to lie flush against the respective pair of planar alignment edges for precisely aligning each of the first pipe and the second pipe in the fitting prior to permanently installing the fitting.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
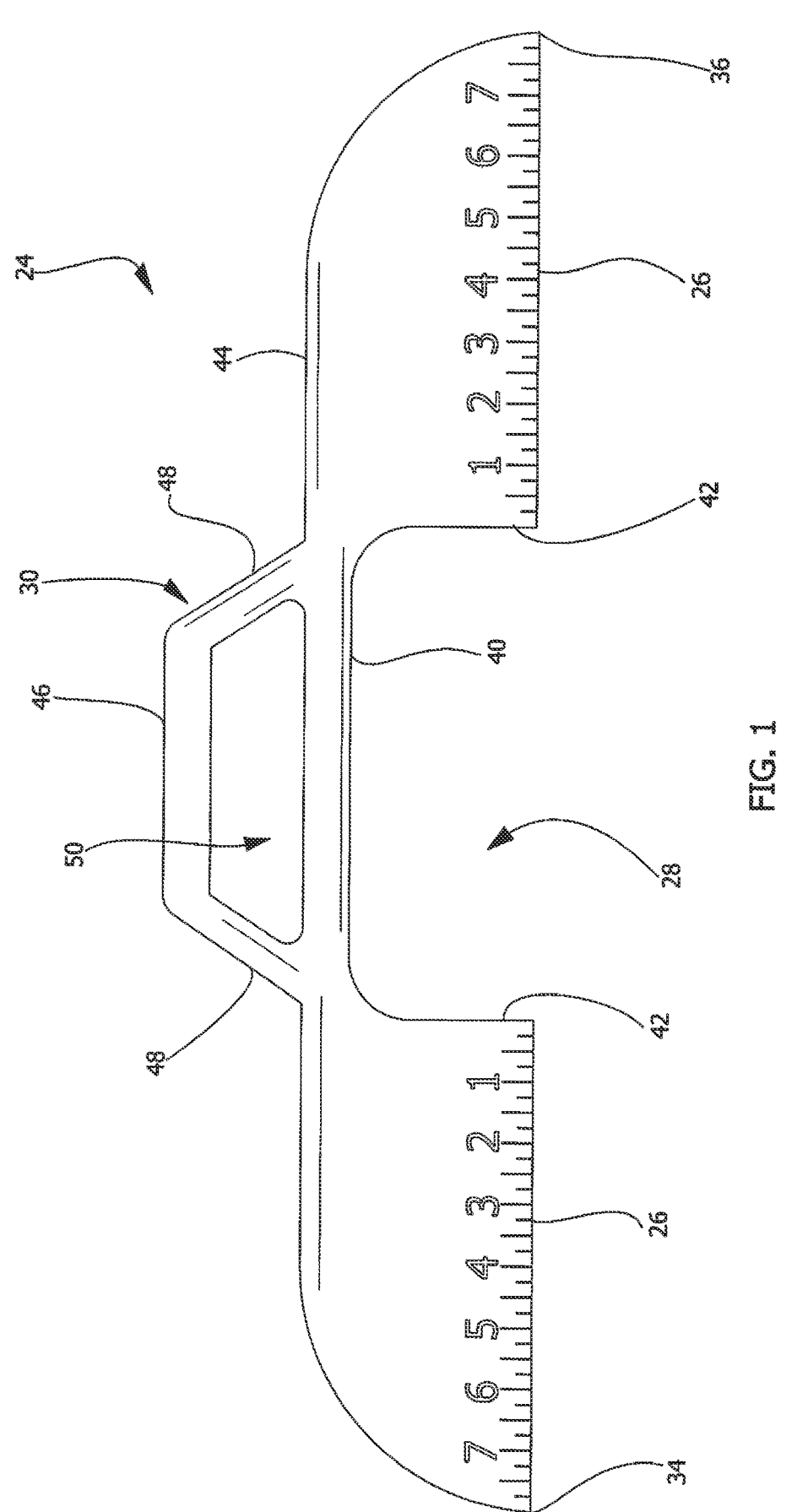
FIG. 1 is a front view of an alignment jig of embodiment of the disclosure.
Figure 2:
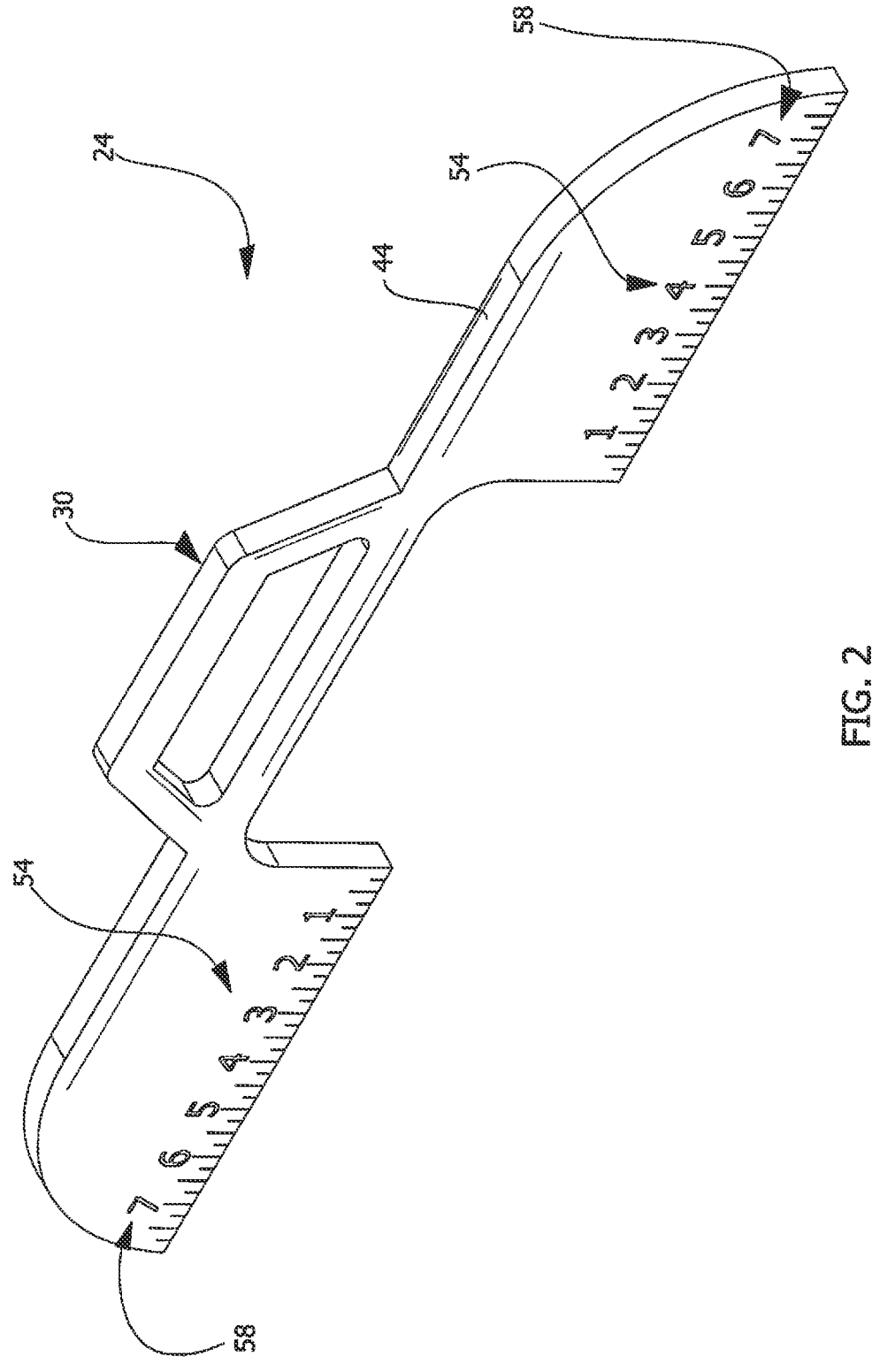
FIG. 2 is a front perspective view of an alignment jig of an embodiment of the disclosure.
Figure 3:
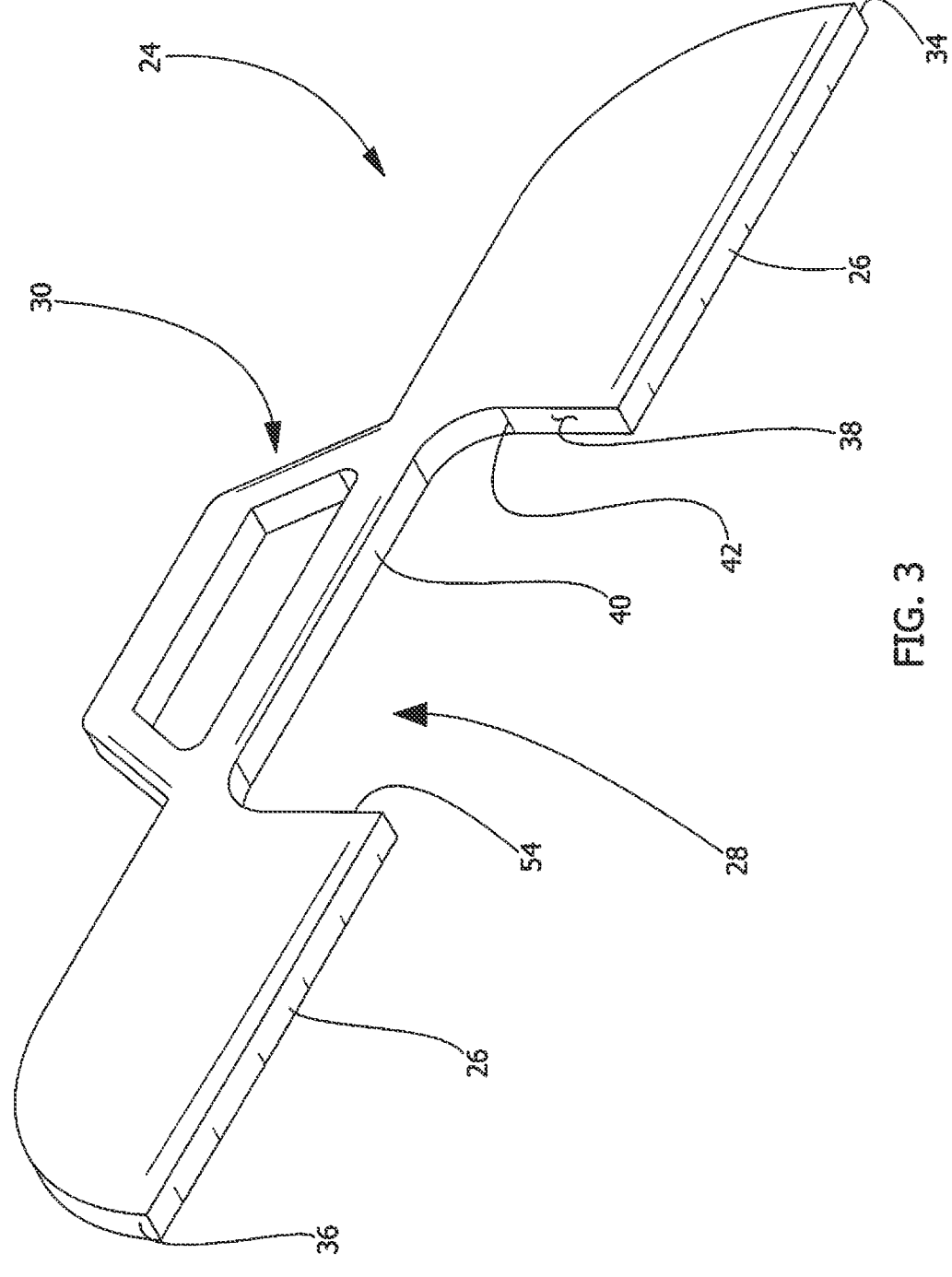
FIG. 3 is a back perspective view of an alignment jig of an embodiment of the disclosure.
Figure 4:
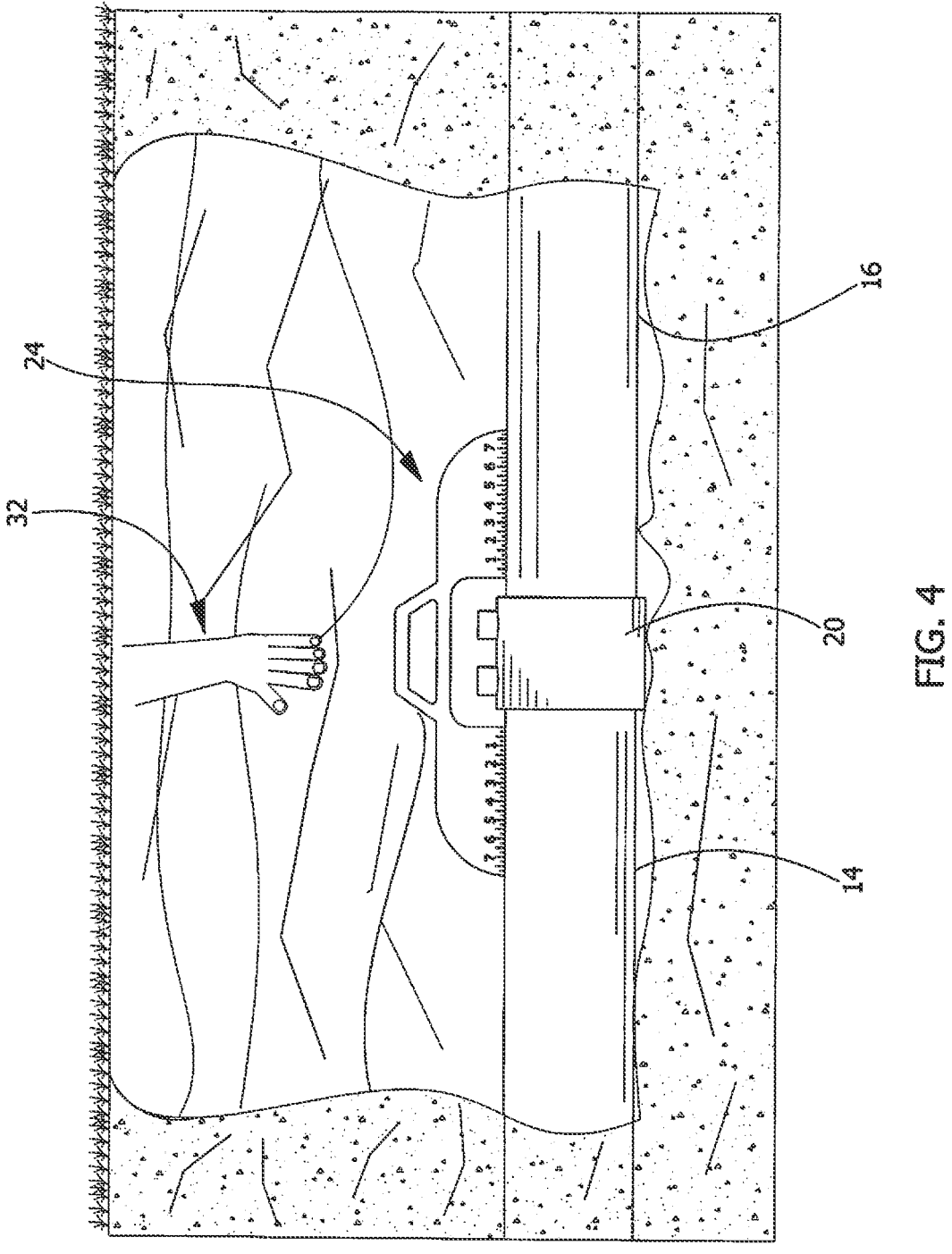
FIG. 4 is a perspective in-use view of an embodiment of the disclosure showing a pair of excavated pipes being aligned.
Figure 5:
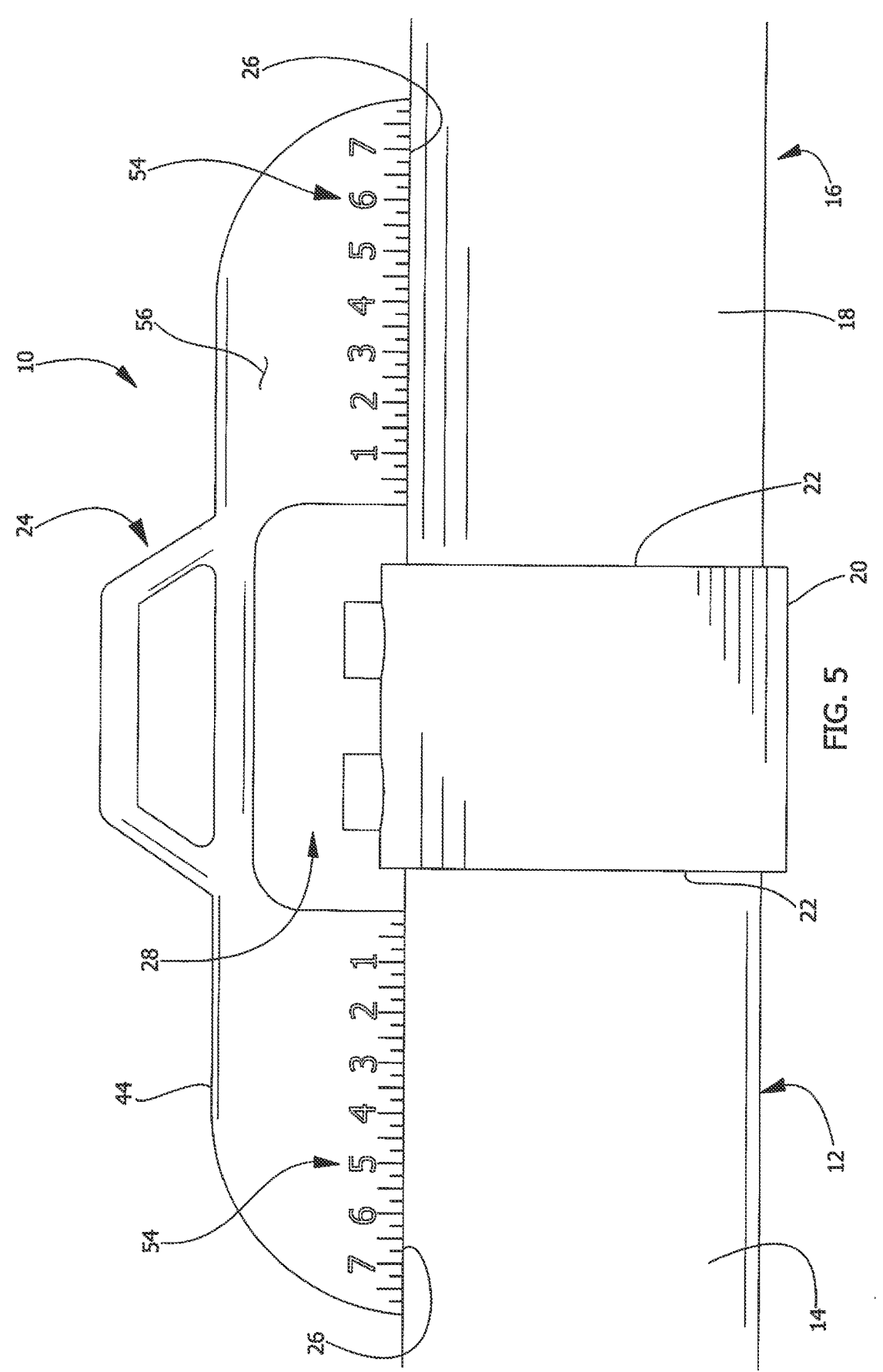
FIG. 5 is a front view of a pipe alignment device according to an embodiment of the disclosure.

With reference now to the drawings, and in particular to FIGS. 1 through 5 thereof, a new alignment device embodying the principles and concepts of an embodiment of the disclosure and generally designated by the reference numeral 10 will be described.

As best illustrated in FIGS. 1 through 5, the pipe alignment device 10 generally comprises a first pipe 12 that has an outer wall 14 and a second pipe 16 that has an outer wall 18. Each of the first pipe 12 and the second pipe 16 may comprise polyethylene pipes or other types of pipes commonly buried for carrying water or other fluid. A fitting 20 is included which has a pair of pipe entries 22 and each of the first pipe 12 and the second pipe 16 is insertable into a respective one of the pair of pipe entries 22 for joining the first pipe 12 to the second pipe 16. The fitting 20 may comprise an electrofusion fitting or a butt-fusion fitting commonly employed for joining polyethylene pipes. Furthermore, as is most clearly shown in FIG. 4, each of the first pipe 12, the second pipe 16 and the fitting 20 may be buried beneath ground having been excavated for service.

An alignment jig 24 is included which has a pair of planar alignment edges 26 and a cutout 28 extending between the pair of planar alignment edges 26. A respective one of the pair of planar alignment edges 26 is positionable on the outer wall 16 of the first pipe 12 and a respective one of the pair of alignment edges 26 is positionable on the outer wall 18 of the second pipe 16 having the cutout 28 accommodating the fitting 20. Each of the first pipe 12 and the second pipe 16 is adjusted such that the outer wall 16 of the first pipe 12 and the outer wall 18 of the second pipe 16 lays flush against the respective pair of planar alignment edges 26. In this way each of the first pipe 12 and the second pipe 16 can be precisely aligned in the fitting 20 prior to permanently installing the fitting 20.

The alignment jig 24 has a handle 30 that is integrated into the alignment jig 24 and the handle 30 is positioned on an opposite side of the alignment jig 24 with respect to the pair of planar alignment edges 26. In this way the handle 30 can be gripped by a worker 32 to facilitate the worker 32 to place the alignment jig 24 on each of the first pipe 12 and the second pipe 16. The alignment jig 24 has a first end 34 and a second end 36 and each of the pair of planar alignment edges 26 terminates at a respective one of the first end 34 and the second end 36. The cutout 28 is centrally positioned between the first end 34 and the second end 36 has the cutout 28 extending upwardly between the pair of planar alignment edges 26.

The cutout 28 has a bounding surface 38 and the bounding surface 38 has an upper portion 40 extending between a pair of upright portions 42. Each of the upright portions 42 perpendicularly intersects a respective one of the pair of planar alignment edges 26 such that the upper portion 40 is oriented parallel to each of the pair of planar alignment edges 26. The alignment jig 24 has an upper edge 44 which lies on a plane that is oriented parallel to each of the pair of planar alignment edges 26. The upper edge 44 curves downwardly to intersect each of the first end 34 and the second end 36 of the alignment jig 24.

The handle 30 has a central member 46 extending between a pair of outward members 48. Each of the outward members 48 extends upwardly from the upper edge 44 having the pair of outward members 48 angling toward each other and having the central member 46 being spaced from the upper edge 44 to define a hole 50 in the handle 30. The hole 50 accommodates the worker's hand 52 for gripping the central member 46. Indicia 54 are applied to a front surface 56 of the alignment jig 24 and the indicia 54 comprise a pair of graduated scales 58 each being aligned with a respective one of the pair of planar alignment edges 26. Additionally, each of the pair of graduated scales 58 extends between the cutout 28 and a respective one of the first end 34 and the second end 36. The graduated scales 58 facilitate a measurement of either inches or centimeters to be accomplished during the process of aligning the first pipe 12 and the second pipe 14 when a measurement becomes necessary. Each of the graduated scales 58 may have a range of at least 8.0 inches or 20.0 cm and the cutout 28 may have a width that is at least equivalent to the length of each of the pair of planar alignment edges 26.

In use, each of the first pipe 12 and the second pipe 16 is inserted into the respective pipe entry 22 in the fitting 20 when necessary preparation work has been completed on the first pipe 12 and the second pipe 16. The alignment jig 24 is positioned on top of each of the first pipe 12 and the second pipe 16 such that the respective planar alignment edges 26 lies on the outer wall 16 of first pipe 12 and the outer wall 18 of the second pipe 16 and the fitting 20 is positioned in the cutout 28. Each of the first pipe 12 and the second pipe 16 are adjusted to facilitate the respective planar alignment edges 26 to lie flush on the outer wall 16 of the first pipe 12 and the outer wall 18 of the second pipe 16. The fitting 20 is manipulated to permanently attach the first pipe 12 and the second pipe 16 together having each of the first pipe 12 and the second pipe 16 being precisely aligned. The alignment jig 24 is removed from the first pipe 12 and the second pipe 16 and each of the first pipe 12 and the second pipe 16 and the fitting 20 are buried, if necessary, or otherwise prepared to be returned to service.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pipe alignment device for aligning a pair of pipes that are being joined together with an electrofusion joint, said assembly comprising:

a first pipe having an outer wall;

a second pipe having an outer wall;

a fitting having a pair of pipe entries, each of said first pipe and said second pipe being insertable into a respective one of said pair of pipe entries for joining said first pipe to said second pipe; and an alignment jig, said alignment jig being planar, said alignment jig having a pair of planar alignment edges, said planar alignment edges being coplanar and spaced apart by a cutout extending between said pair of planar alignment edges, said planar alignment edges being elongated and linearly aligned with each other, each of said pair of planar alignment edges being positionable on said outer wall of a respective one of said first pipe and said second pipe such that said cutout accommodates said fitting, each of said first pipe and said second pipe being adjusted such that said outer wall of each of said first pipe and said second pipe lays flush against said respective pair of planar alignment edges for precisely aligning each of said first pipe and said second pipe in said fitting prior to permanently installing said fitting; and said alignment jig having a handle being integrated into said alignment jig, said handle being positioned on an opposite side of said alignment jig with respect to said pair of planar alignment edges, said handle being vertically aligned with said cutout such that said handle is positioned between said planar alignment edges wherein said handle is configured to be gripped by a worker to facilitate the worker to place said alignment jig on each of said first pipe and said second pipe.

2. The assembly according to claim 1, wherein:

said alignment jig has a first end and a second end;

each of said pair of planar alignment edges terminating at a respective one of said first end and said second end;

said cutout is centrally positioned between said first end and said second end having said cutout extending upwardly between said pair of planar alignment edges;

said cutout has a bounding surface, said bounding surface having an upper portion extending between a pair of upright portions;

each of said upright portions perpendicularly intersects a respective one of said pair of planar alignment edges such that said upper portion is oriented parallel to each of said pair of planar alignment edges;

said alignment jig having an upper edge which lies on a plane being oriented parallel to each of said pair of planar alignment edges; and said upper edge curving downwardly to intersect each of said first end and said second end of said alignment jig.

3. The assembly according to claim 2, wherein:

said handle has a central member extending between a pair of outward members; and each of said outward members extends upwardly from said upper edge having said pair of outward members angling toward each other and having said central member being spaced from said upper edge to define a hole in said handle wherein said hole is configured to accommodate the user's hand for gripping said central member.

4. The assembly according to claim 2, wherein said alignment jig has indicia being applied to a front surface of said alignment jig, said indicia comprising a pair of graduated scales each being aligned with a respective one of said pair of planar alignment edges, each of said pair of graduated scales extending between said cutout and a respective one of said first end and said second end.

5. A pipe alignment device for aligning a pair of pipes that are being joined together with an electrofusion joint, said assembly comprising:

a first pipe having an outer wall;

a second pipe having an outer wall;

a fitting having a pair of pipe entries, each of said first pipe and said second pipe being insertable into a respective one of said pair of pipe entries for joining said first pipe to said second pipe; and an alignment jig, said alignment jig being planar, said alignment jig having a pair of planar alignment edges, said planar alignment edges being coplanar and spaced apart by a cutout extending between said pair of planar alignment edges, said planar alignment edges being elongated and linearly aligned with each other each of said pair of planar alignment edges being positionable on said outer wall of a respective one of said first pipe and said second pipe such that said cutout accommodates said fitting, each of said first pipe and said second pipe being adjusted such that said outer wall of each of said first pipe and said second pipe lies flush against said respective pair of planar alignment edges for precisely aligning each of said first pipe and said second pipe in said fitting prior to permanently installing said fitting, said alignment jig having a handle being integrated into said alignment jig, said handle being positioned on an opposite side of said alignment jig with respect to said pair of planar alignment edges, said handle being vertically aligned with said cutout such that said handle is positioned between said planar alignment edges wherein said handle is configured to be gripped by a worker to facilitate the worker to place said alignment jig on each of said first pipe and said second pipe, said alignment jig having a first end and a second end, each of said pair of planar alignment edges terminating at a respective one of said first end and said second end, said cutout being centrally positioned between said first end and said second end having said cutout extending upwardly between said pair of planar alignment edges, said cutout having a bounding surface, said bounding surface having an upper portion extending between a pair of upright portions, each of said upright portions perpendicularly intersecting a respective one of said pair of planar alignment edges such that said upper portion is oriented parallel to each of said pair of planar alignment edges, said alignment jig having an upper edge which lies on a plane being oriented parallel to each of said pair of planar alignment edges, said upper edge curving downwardly to intersect each of said first end and said second end of said alignment jig, said handle having a central member extending between a pair of outward members, each of said outward members extending upwardly from said upper edge having said pair of outward members angling toward each other and having said central member being spaced from said upper edge to define a hole in said handle wherein said hole is configured to accommodate the user's hand for gripping said central member, said alignment jig having indicia being applied to a front surface of said alignment jig, said indicia comprising a pair of graduated scales each being aligned with a respective one of said pair of planar alignment edges, each of said pair of graduated scales extending between said cutout and a respective one of said first end and said second end.

* * * * *